Figure 1:
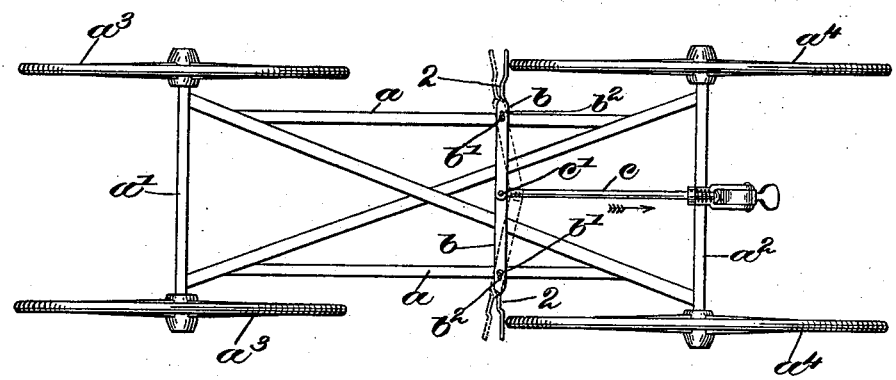

(No Model.)

J. P. HOLMAN.
VEHICLE BRAKE.

No. 564,562. Patented July 21, 1896.

Witnesses.
Fred S. Greenleaf.
Thomas J. Drummond.

Inventor.
Joseph P. Holman.
by Crosby & Gregory
attys.

UNITED STATES PATENT OFFICE.

JOSEPH P. HOLMAN, OF LEOMINSTER, MASSACHUSETTS, ASSIGNOR TO THE F. A. WHITNEY CARRIAGE COMPANY, OF SAME PLACE.

VEHICLE-BRAKE.

SPECIFICATION forming part of Letters Patent No. 564,562, dated July 21, 1896.

Application filed January 13, 1896. Serial No. 575,267. (No model.)

*To all whom it may concern:*

Be it known that I, JOSEPH P. HOLMAN, of Leominster, county of Worcester, and State of Massachusetts, have invented an Improvement in Vehicle-Brakes, of which the following description, in connection with the accompanying drawings, is a specification, like letters and figures on the drawings representing like parts.
This invention has for its object the production of a novel vehicle-brake, the same being particularly adapted for use in connection with baby-carriages or other small or light vehicles.
In accordance with my invention, I employ a plurality of brake members, fulcrumed, and so arranged with relation to the wheel that when moved into one of their positions their ends engage, respectively, with the wheels of the vehicle, and when moved into their other positions said ends will be removed from engagement with said wheel to release the brake. Suitable operating means is also arranged in accessible position for operating the brake members and holding them in either of their extreme positions, such means, together with the other features of my invention, being hereinafter fully described, and pointed out in the claims.
In the drawings, Figure 1, in plan view, shows a vehicle-frame with the wheels equipped with a brake embodying my invention; Fig. 2, a detail showing one form of controlling device for the brake, and Fig. 3 a similar view showing said device in a different position.

Referring to the drawings in the particular embodiment of my invention herein shown as an illustration, $a$ $a$ represents two of the side portions of a vehicle-frame or parts of a vehicle-body, whichever the brake parts are to be connected with, said members $a$ $a$ being shown as carried upon the usual axles $a'$ $a^2$, mounted upon suitable wheels $a^3$ $a^4$.
Secured to the members $a$ $a$ or to any desired part of the vehicle are the brake members or levers $b$ $b$, shown as fulcrumed to the said members at $b'$ upon screws or other fulcrum devices, preferably passed through slots $b^2$ in the said brake members, the latter, for cheapness of construction, being shown as flat pieces of metal, twisted at 2 2, to adapt their ends for frictional engagement with the periphery of the wheels or either of them, herein shown as the wheels $a^4$.

The inner adjacent ends of the brake members $b$ are connected with the end of a suitable operating-rod $c$, said members being shown as jointed at $c'$ directly to said rod, the latter at its opposite end (see Figs. 2 and 3) being inserted through and guided by a support, shown as a lip $d$ on a clip $d'$, clamped in suitable manner, as by a screw $d^2$, to the axle $a^3$, or preferably to some part of the vehicle-frame higher than said axle and in convenient position for use.

Figure 2:
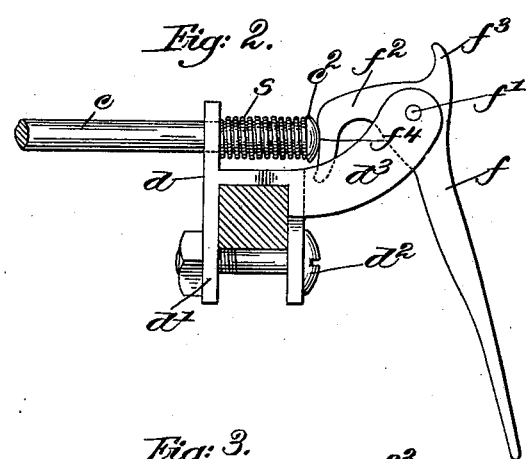

Between the support $d$ and the headed end $c^2$ of the operating-rod I have herein interposed a spring $s$, which tends to move the operating-rod longitudinally in the direction of the arrow, Fig. 1, to release the brake, although said spring may be otherwise arranged to fulfil this function, if desired.

Figure 3:
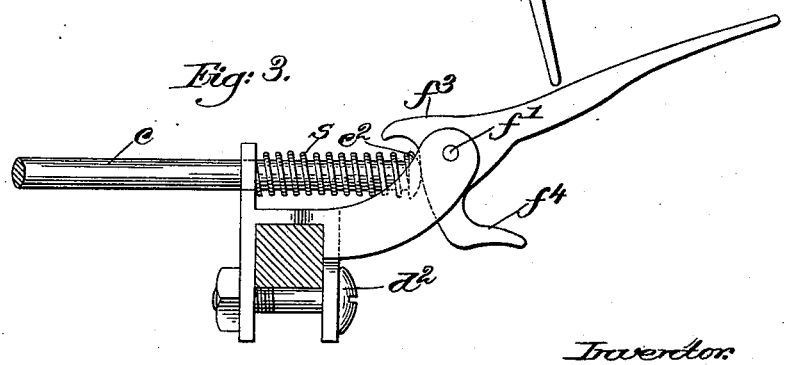

For moving the rod $c$ and operating the brake, I provide a suitable operating device, herein shown as a lever $f$, pivoted at $f'$ in suitable ears $d^3$ on the clip $d$, and provided at its end with a laterally-extended foot $f^2$, provided at one end with a heel projection $f^3$ and at its opposite end with an upturned toe projection $f^4$, preferably arranged as shown in Figs. 2 and 3 of the drawings.

The toe portion $f^4$, it will be seen, is more remote from the fulcrum $f'$ of the lever than the portion adjacent the heel $f^3$, so that when the lever is forced into its position, Fig. 2, with the toe $f^4$ resting against the end of the operating-rod $c$, it will be clear that the said rod must be forced to the left in Fig. 2, and in Fig. 1 in the direction opposite the arrow, to press the brake members into contact with the wheels, in which position the said lever automatically retains itself, so that the carriage with the brake applied may be left unattended, if desired. When turned into its position, Fig. 3, however, the lever permits the rod $c$, under the action of its spring $s$, to spring to the right, Fig. 3, and in the direction of the arrow, Fig. 1, with its headed end against the heel portion of the lever for the release of the brake.

The heel projection $f^3$, in the construction shown, acts to limit the spring-actuated movement of the lever, for without some such stop the action of the spring in moving the rod from the toe $f^4$, along the cam-shaped surface to the heel portion of the foot, might cause the lever $f$ to move past its final position by the momentum acquired.

A brake embodying my invention presents the simplest possible construction, and is, nevertheless, effective in its operation; and while I have shown and described my invention in the best adaptation now known to be it is evident my invention is not necessarily limited to the construction shown, for the same may be varied within the scope of the invention.

What I claim is—

1. In a vehicle-brake, the combination with the fulcrumed brake members and the operating-rod connected therewith, of a spring to move the said members in one direction, and a fulcrumed operating device independent of said rod, said operating device consisting of a lever pivoted transversely to said rod to swing in line therewith, and provided at its end with two connected surfaces located at different radial distances from the fulcrum of said lever, said surfaces being adapted to operate against said rod endwise thereof, substantially as described.

2. In a vehicle-brake, the combination with a fulcrumed brake member, and an operating-rod connected therewith, of a support for the free end of said operating-rod, a spring retained on said rod between said support and the end of said rod, and a cam-lever mounted adjacent the said end of said rod to bear against the latter, and, by its movement, to set the brake, said lever having a portion of its cam-surface formed to receive said end and hold the same in locked braking position, and another portion to hold the lever in releasing position by reason of the tension of said spring, said latter portion terminating in an overhanging heel projection to prevent further movement of the lever, substantially as described.

3. In a vehicle-brake, the combination with a fulcrumed brake member, and an operating-rod connected therewith, of a support for the free end of said operating-rod, a spring retained on said rod between said support and the end of said rod, the said support having, besides a lip holding said rod, a clip adapted to embrace the axle and be clamped thereto, and rearwardly-extending ears, and a cam-lever pivoted in said ears to swing in line with said rod to bear endwise thereon, the cam-surface thereof having a toe projection at one end thereof and a heel projection at the other end thereof to limit the swing of the lever in either direction, substantially as described.

In testimony whereof I have signed my name to this specification in the presence of two subscribing witnesses.

JOSEPH P. HOLMAN.

Witnesses:
CHARLES A. JOSLIN,
MARGARET D. MORSE.